(12) United States Patent
Schmoetzer et al.

(10) Patent No.: US 9,584,338 B2
(45) Date of Patent: Feb. 28, 2017

(54) BUS DEVICE AND BUS SYSTEM WITH CONSUMERS, PRODUCERS, AND AN ALLOCATION FEATURE

(71) Applicant: BUERKERT WERKE GMBH, Ingelfingen (DE)

(72) Inventors: Ralf Schmoetzer, Doerzbach (DE); Volker Haaf, Crailsheim (DE); Marcus Fischer, Neuenstadt ot Stein (DE)

(73) Assignee: BUERKERT WERKE GMBH (DE)

( * ) Notice: Subject to any disclaimer, the term of this patent is extended or adjusted under 35 U.S.C. 154(b) by 660 days.

(21) Appl. No.: 14/079,407

(22) Filed: Nov. 13, 2013

(65) Prior Publication Data
US 2014/0188293 A1    Jul. 3, 2014

(30) Foreign Application Priority Data

Nov. 14, 2012 (DE) .................. 10 2012 022 301

(51) Int. Cl.
| | | |
|---|---|---|
| *G06F 19/00* | (2011.01) | |
| *H04L 12/40* | (2006.01) | |
| *G05B 19/042* | (2006.01) | |

(52) U.S. Cl.
CPC ...... *H04L 12/40169* (2013.01); *G05B 19/042* (2013.01); *G05B 2219/14047* (2013.01); *G05B 2219/25111* (2013.01); *G05B 2219/33055* (2013.01); *H04L 2012/40215* (2013.01)

(58) Field of Classification Search
CPC ....... H04L 2012/40215; H04L 61/6027; H04L 12/40169; G05B 19/041; G05B 2219/33055; G05B 2219/14047; G05B 2219/25111

USPC .................................. 700/127, 128
See application file for complete search history.

(56) References Cited

U.S. PATENT DOCUMENTS

| | | | |
|---|---|---|---|
| 5,537,104 A | 7/1996 | Van Dort et al. | 340/825.52 |
| 5,883,343 A | 3/1999 | MacDonald et al. | 187/383 |
| 6,366,826 B1 * | 4/2002 | Mead | D21G 9/0027 |
| | | | 700/127 |
| 6,812,596 B2 | 11/2004 | Veil | 307/326 |

(Continued)

FOREIGN PATENT DOCUMENTS

| | | | | |
|---|---|---|---|---|
| DE | 100 20 075 | 11/2001 | | H01R 27/02 |
| DE | 692 28 664 | 11/2001 | | G08C 15/00 |

(Continued)

OTHER PUBLICATIONS

Wollschlaeger, Martin, Erik Unger, and Heiko Witte. "CANopen Device Profile for Hydraulic Proportional Valves." Fieldbus Technology. Springer Vienna, 1999. 118-125.*

(Continued)

*Primary Examiner* — Michael D Masinick
(74) *Attorney, Agent, or Firm* — Hayes Soloway P.C.

(57) ABSTRACT

A device, a fluidic system, a BUS system and a method of operating this BUS system are indicated. The BUS system includes a multitude of users which are producers and/or consumers of at least one process value. Information regarding at least one allocation feature is transmitted to the users of the BUS system by the users of a group of users of the BUS system and by the respective users of the groups themselves. The allocation feature is determined by the at least one process value produced and/or consumed by the respective users.

19 Claims, 6 Drawing Sheets

(56) References Cited

U.S. PATENT DOCUMENTS

| | | | |
|---|---|---|---|
| 6,942,785 B2 * | 9/2005 | Bayer | B01F 13/0059 137/270 |
| 7,684,875 B2 | 3/2010 | Jundt et al. | 700/19 |
| 9,357,663 B2 * | 5/2016 | Haaf | G01D 11/24 |
| 2009/0307405 A1 * | 12/2009 | Ottliczky | F15B 13/0853 710/305 |
| 2012/0054483 A1 * | 3/2012 | Haaf | G06F 9/4403 713/2 |

FOREIGN PATENT DOCUMENTS

| | | | |
|---|---|---|---|
| DE | 103 03 477 | 7/2003 | H02J 13/00 |
| DE | 10 2008 007 230 | 8/2008 | G05B 19/048 |
| EP | 0 846 642 | 6/1998 | B66B 1/20 |
| WO | WO02065221 | 8/2002 | B01F 13/00 |

OTHER PUBLICATIONS

Cena et al, "A Protocol for Automatic Node Discovery in CANopen Networks", IEEE Transactions on Industrial Electronics, vol. 50, No. 3, Jun. 2003.*

Extended European Search Report (no translation) issued in application No. 1392984.6, dated Jul. 7, 2015 (9 pgs).

Löbl et al., "Distributed Automation Control Using Broadcasting Networks," Proceedings of the International Conference on Industrial Electronics, Control and Instrumentation (IECON). Bologna, Sep. 5-9, 1994, pp. 1211-1213 (3 pgs).

German Search Report issued in corresponding German Patent Appln. Serial No. 10 2012 022 301.3 dated Jul. 22, 2013 (5 pgs).

* cited by examiner

BUS DEVICE AND BUS SYSTEM WITH CONSUMERS, PRODUCERS, AND AN ALLOCATION FEATURE

FIELD OF THE INVENTION

The invention relates to a device comprising a BUS system with a multitude of users which are producers and/or consumers of at least one process value. The invention further relates to a fluidic system with such a device and to a BUS system with a multitude of users, and to a method of operating this BUS system.

TECHNICAL BACKGROUND

Process engineering systems, in particular fluidic systems, comprise a multitude of components which generate process values, e.g. measured values or parameters, and are therefore referred to as producers of the respective process values. In addition, process values are processed by the components of the system, or the respective components are closed-loop or open-loop controlled with the aid of the process values. Such components processing the process values are referred to as consumers of the process values. For exchanging the process values, the components of such a system are in most cases connected among one another via a BUS system. The components are thus also users of this BUS system.

In a process engineering system, the consumers and the producers of process values need to be allocated so as to match each other. In particular, each consumer of a process value should be able to receive from a producer the process values which it requires, to allocate them to the respective producer and consume them as needed. An allocation between consumers and producers of process values is frequently effected with the aid of a master unit of the system. Such a master unit has the necessary information at its disposal with regard to the process values produced and consumed by the individual components of the system. Based on this information, an appropriate allocation can be made. But system architectures of this type are not very flexible since in the case of an exchange of components or when changes are made to the system, the master unit needs to be reconfigured, involving great effort.

SUMMARY

It is an object of the invention to indicate an improved device comprising a BUS system with a multitude of users which are producers and/or consumers of process values. It is a further object of the invention to indicate an improved fluidic system comprising such a device. Furthermore, it is an object of the invention to indicate an improved BUS system as well as an improved method of operating such a BUS system.

According to an aspect of the invention, a device is indicated which includes a BUS system with a multitude of users. The users may be producers and/or consumers of at least one process value. The device may be a process engineering system or a process engineering installation and, in particular, a fluidic system. The process values may be measured values and/or parameters within such a system. If the device is a fluidic system, the users, in particular all users, of the BUS system may be fluidic components. It is, however, not required that all users are fluidic components. The users of a group of users of the BUS system may transmit information regarding at least one allocation feature to the users of the BUS system. This allocation feature relates to the respective users of the group themselves and is transmitted by that particular user of the group itself. The allocation feature may be determined by the at least one process value produced and/or consumed by that particular user.

Advantageously, the process values may be provided with a classification; in this case, the allocation feature, in addition to the process value, may be further determined by the classification of the process value and/or by a type of the process value.

A classification of a process value may be determined, for example, based on a type and/or a kind of the user producing or consuming the process value concerned. Furthermore, a classification of the process value may be determined based on a position and/or based on an arrangement of the particular user within an installation, in particular an arrangement within a fluid technology system, and/or within the BUS system. In addition, the classification of the process value may be determined based on a functionality of the user. An example of a classification would be: type of process value: pressure; arrangement of the user within an installation: process line no. 3; functionality of the user: pressure sensor.

According to a further embodiment, the BUS system may be a field bus system. In particular, a serially and asynchronously operating BUS system may be involved, for example a CAN-based field bus system. CANopen or a protocol compatible with CANopen may be used as the communication protocol.

According to the prior art, in a CANopen network there always exists an NMT master (NMT=network management); the other users are NMT slaves. The NMT master has complete control over the slave users and can change the state thereof. For example, the NMT master can put the slave users into one of the states defined in the CANopen standard, namely "Initialization", "Pre-Operational", "Operational", and "Stopped", or can alter the state of a slave user. In accordance with the CANopen standard, in the "Pre-Operational" state the slave users can communicate only via SDO messages (SDO=Service Data Object). In the "Stopped" state, the users communicate exclusively via NMT and Heartbeat messages. They can neither send PDO messages (PDO=Process Data Objects) nor Emergency messages.

According to an embodiment, however, all users of the BUS system are equipped with an equivalent network functionality. Thus, in other words, all users can, for example, feature the functionality of an NMT master and, for example, can put themselves or other users into a different operating state. In addition, the users of the BUS system may, for example, not be subject to any restriction with respect to the type of messages sent by them. In order to send a respective message, the users can, for example, change their state on their own. Just as the users of the BUS system can be regarded as master units in accordance with their network functionality, in a similar manner all users can also be regarded as slave units. A division into or differentiation between master and slave units is not made since the users of the BUS system may be equipped with an equivalent network functionality.

According to an embodiment, a first user of the group of users of the BUS system is designed to send an offer telegram and/or a request telegram to the other users of the BUS system. A second user of the BUS system may be designed to send an offer telegram at least to the first user in response to a request telegram of the first user.

In the context of the present description, an "offer telegram" and a "request telegram" are each to be understood to be a message communicated within the BUS system. If the BUS system operates in accordance with the CAN standard and uses CANopen as the communication protocol, an offer telegram or request telegram, according to such an embodiment of the invention, may be a telegram or frame which is compatible with the CAN standard.

An offer telegram may comprise information regarding a process value produced by a user of the BUS system. Conversely, a request telegram may comprise information regarding a process value to be consumed by a user of the BUS system. If a user of the BUS system is a producer of process values, it may be more particularly suited to send offer telegrams, whereas, if a user of the BUS system is a consumer of process values, it may be more particularly suited to send request telegrams. A user may more particularly be a consumer and, at the same time, a producer of process values. This means that it may be designed to send and/or to receive both offer telegrams and request telegrams. In particular, the users of the BUS system, for example all users of the BUS system, may be designed to receive offer telegrams.

Within the BUS system according to aspects of the invention, there is thus effected a direct communication between the users of the BUS system, without a master unit being necessary for this. The users of the BUS system receive offer telegrams, and a consumer of a process value directly identifies a producer of the process value it requires and subsequently allocates this producer to the respective process value; in this way it can find a matching producer of the process value without the interaction or configuration by a master unit being necessary. The option of a manual configuration of the users via service data objects (SDO) remains unaffected by this. This possibility of an autonomous self-configuration of the device simplifies installation of the device and facilitates its reconfiguration both in view of an exchange and in view of a substitution of users.

According to a further embodiment, the users of the group of the BUS system may each be at least a producer of at least one process value. The users of the group may furthermore be designed to send an offer telegram each to the other users of the BUS system, the offer telegram comprising information regarding the process values produced by the respective user and a classification of these process values. At least one further user of the BUS system, which is at least a consumer of at least one process value, may be designed to receive the offer telegrams of the users of the group and to evaluate each with regard to the classification of the process values offered. This evaluation may be performed inside the further user, for example in that it compares the classification of the process values offered with its own requirements specification with regard to the classification of the process values consumed by it. The further user of the BUS system may select those users from the users of the group for which this comparison is successful. The further user may send a respective specific request telegram each to this subgroup of users. This specific request telegram may contain a query with regard to the type of the at least one process value offered. This type may be the unit, the data type and/or the accuracy of the process value, for example.

By matching the allocation features of the process values offered against a requirements specification, the further user can make a preselection with regard to the producer of the respective process value. This preselection is made by sending—only in the event of a successful comparison—a specific request telegram, which may be a standard CANopen telegram, to the respective producer of the process value. The preselection reduces the number of messages sent within the BUS system, so that the network load can be reduced.

According to a further embodiment, the users of the subgroup may be designed to send a likewise specific offer telegram to the further user in reply to this specific request telegram of the further user. This specific offer telegram may comprise information regarding the type of the process value produced by the respective user of the subgroup. The further user, which receives these specific offer telegrams, may now, for its part, be designed to evaluate the information regarding the type of the process values produced by the respective users of the subgroups and to firmly allocate one of the users of the subgroup as a producer to the process value concerned. In such a device according to aspects of the invention, a consumer of a process value can automatically find the matching producer itself, with information regarding the type of the process value being additionally taken into account.

The further user may furthermore be designed to monitor the producer(s) of the process value. If the BUS system is based on the CANopen communication protocol, this monitoring may be performed with the aid of the Heartbeat messages automatically generated by the producer.

In addition, the device may be designed such that a user which is a consumer of process values allocates not only one single producer, but a plurality of redundantly operating producers to the corresponding process value. In this way, the consumer can select from a plurality of producers regarding the process value. This redundancy increases the reliability of the device since the consuming user will automatically select an alternative producer if the producer employed so far regarding the process value concerned should fail. In this connection, all producers can be monitored by the consumer.

According to a further aspect of the invention, a fluidic system is indicated which comprises a device according to aspects of the invention. At least one user of the BUS system of this device may be a fluidic component. In particular, the majority of the users may be fluidic components. Fluidic components include, for example, fluidic open-loop and closed-loop control units, valves, gate valves, flow restrictors, sensor units for measuring physical quantities, e.g., a temperature, a pressure, a flow rate, etc. According to an exemplary embodiment, all users of the BUS system which are producers and/or consumers of process data may be fluidic components.

According to a further aspect of the invention, a BUS system including a multitude of users is indicated in which information regarding at least one allocation feature of the respective users of a group of users of the BUS system is transmitted to the users of the BUS system and by the respective users of the group themselves. These users of the group of the BUS system may be producers and/or consumers of process values. The users of the BUS system may be equivalent with regard to their network functionality. In particular, the BUS system may comprise no user having a master functionality.

According to a further aspect of the invention, a method of operating a BUS system including a multitude of users is indicated. The users of a group of users of the BUS system transmit information regarding one of their allocation features to the other users of the BUS system. In doing so, the information is transmitted by the users of the group themselves.

The same or similar advantages as have already been mentioned with respect to the device according to aspects of the invention are also applicable in the same or a similar manner to the fluidic system, the BUS system, and the method of operating a BUS system and shall therefore not be repeated.

BRIEF DESCRIPTION OF THE DRAWINGS

Further advantageous aspects of the invention will be apparent from the following description of preferred exemplary embodiments with reference to the drawings, in which.

DETAILED DESCRIPTION OF THE EXEMPLARY EMBODIMENTS

Figure 1:
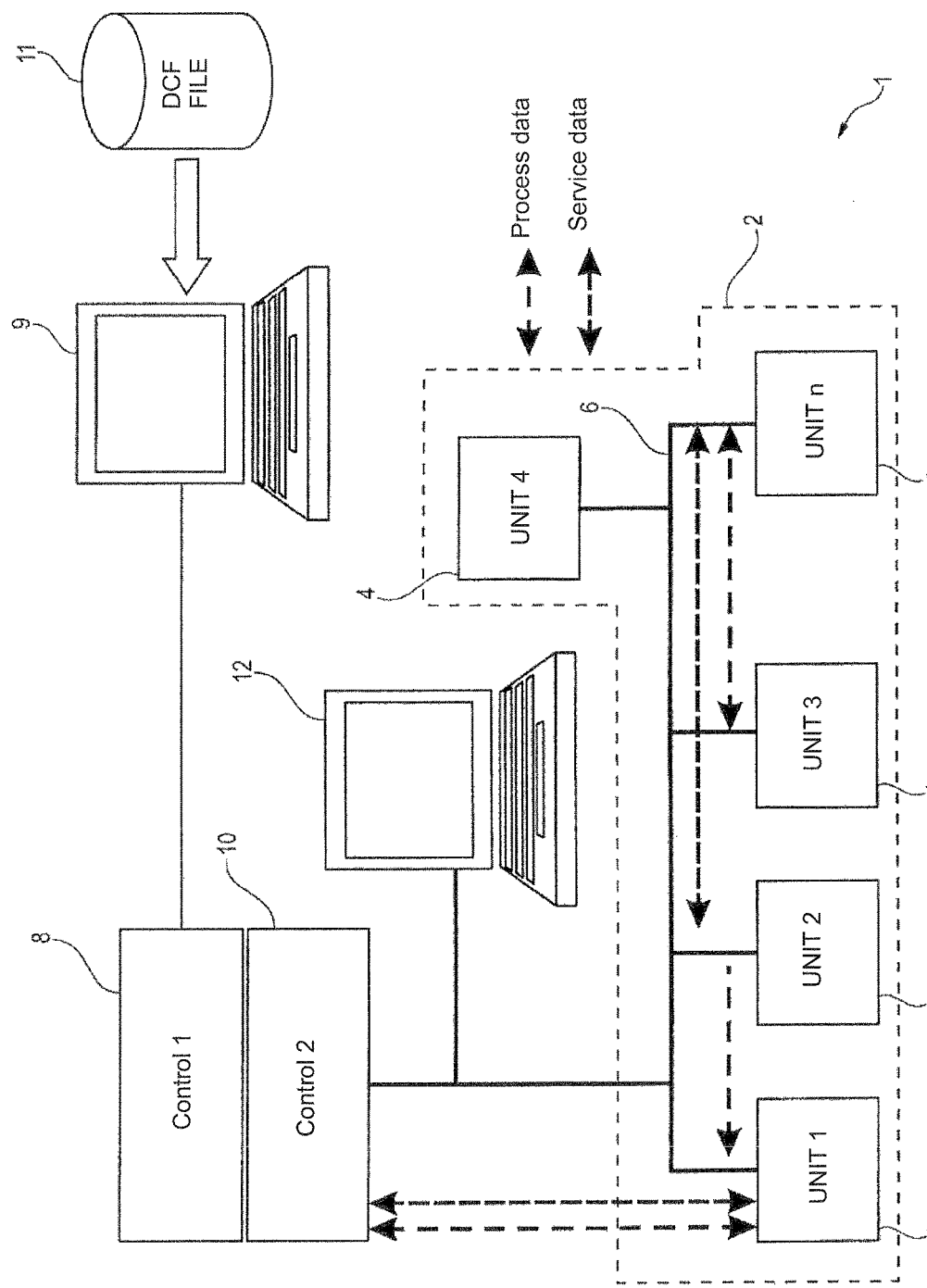
FIG. 1 shows a schematic illustration of a fluidic system which comprises a BUS system, according to an exemplary embodiment.

FIG. 1 shows a schematic and simplified illustration of a device 1, which can be, for example, a fluidic system, according to an exemplary embodiment. The device 1 comprises a BUS system 2 according to an exemplary embodiment. The BUS system 2 comprises a multitude of users 4, denoted by "unit 1" to "unit n". The number of users 4 is limited merely by the communication protocol of the BUS system 2. The BUS system 2 may be an asynchronously and serially operating BUS system, in particular a field bus system. In particular, the BUS system 2 may be a CAN-BUS system (CAN=Controller Area Network), which operates in accordance with the CAN standard. CANopen or a communication protocol compatible with CANopen which satisfies the standard defined by CiA (CAN in Automation) may be used as the communication protocol, for example.

The users 4, which are connected among one another by a data line 6, may, more particularly, be fluidic components of the fluidic system. As is usual in the CAN-based BUS systems, a two- or four-wire copper line may be used for the data line 6. The fluidic components may be, e.g., valves, sensors, measuring instruments, automatic controllers, actuators, regulators, etc. Users 4 may also be display devices, control units or gateways for programming or monitoring the fluidic system.

The users 4 of the BUS system 2 can communicate with one another both unidirectionally and bidirectionally. Both service data and process data can be transmitted, as is illustrated by respective arrows in FIG. 1. If a CANopen-based BUS system 2 is involved, the service data is transferred in SDO telegrams (SDO=Service Data Object), and the process data is transferred in PDO telegrams (PDO=Process Data Object). Communication is not limited to the BUS system 2 itself. The users 4 can also communicate with an externally arranged first controller 8 (controller 1) in the same way. In particular, a DCF (Device Configuration File) can be transferred from a memory 11 to one or more users 4 of the BUS system 2 via a control computer 9 and the first controller 8, for the configuration of the users 4. The device configuration file serves to transfer the device settings to the users 4.

The users 4 can be conferred a further functionality, exceeding their functionality in accordance with the CAN or CANopen standard. The users 4 can be configured for this purpose by means of a further control computer 12 and a further controller 10 (controller 2). But the control computer 12 and the further controller 10 only serve for the corresponding configuration of the users 4. The further functionality exceeding the CAN or CANopen standard relates to the users 4 themselves and is made available by the users themselves, without further external intervention in the BUS system 2 being necessary.

This further functionality relates in particular to the ability of the users 4 of the BUS system 2 to independently, autonomously and automatically establish an allocation between a producer of a process value and a consumer of a process value.

Figure 2:
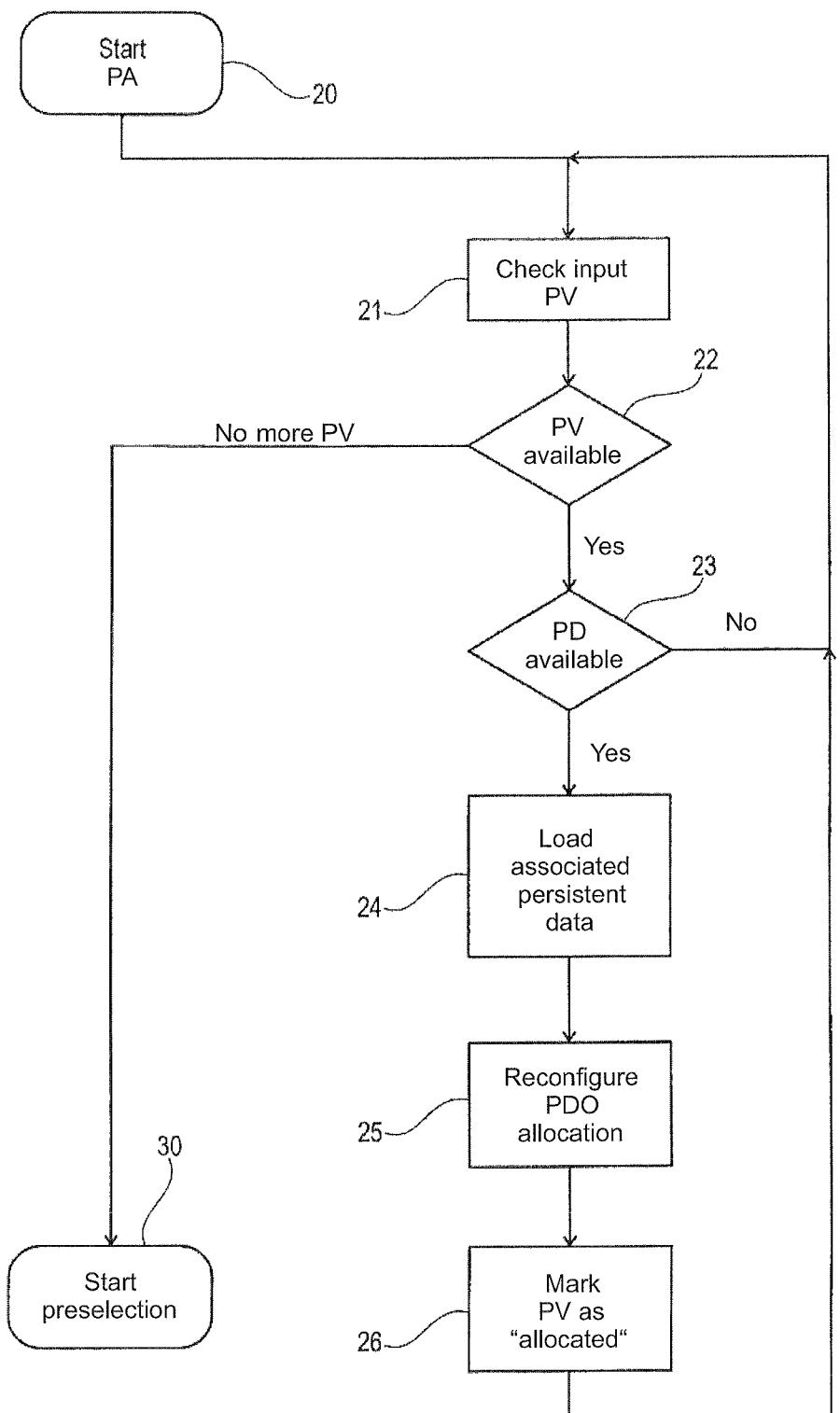
FIGS. 2 to 5 show sections of a flow chart which illustrates a method of operating a BUS system according to an exemplary embodiment.

FIG. 2 shows part of a flow chart which illustrates a method for partner allocation between a producer and a consumer of at least one process value within a device 2 according to an exemplary embodiment. A user 4 starts 20 the partner allocation (referred to as PA for short in the Figures) by initially querying 21 its required process values (PV is used as an abbreviation for process value in the Figures). A query 22 follows, in which the user 4 checks whether an input for these process values is available. Should this be the case, the user 4 next checks 23 whether a description of the producer, i.e. the producing user 4, is available for the respective process value which is consumed by the user 4 (in the Figures, PD is used as an abbreviation for producer description). Should this not be the case, the process value is marked as not available. If, upon another check 22, the user 4 has no more process values at its disposal for which it could query a producer description, if available, the user 4 enters a state of preselection 30. But if a description of the producer is available in step 23, this description is taken over as fixed 24. In other words, the existing description of the producer of the process value is saved as a persistent producer description in the user 4. This may be effected by a respective entry in a directory of object descriptions (object dictionary). The cyclic polling of the process value is configured 25 correspondingly on the basis of the description of the producer; the associated process value is marked 26 as appertaining to this producer and from now on is queried from this producer. This allocation may be performed with the aid of a respective entry in a producer description object. In step 25 of FIG. 2, this reconfiguration and allocation is referred to as "Reconfigure PDO allocation".

At the same time, the consuming user 4 can monitor the producing user 4. For example, the consuming user 4 can monitor the heartbeat signal and/or the heartbeat telegrams of the producer. The consuming user 4 fixes a producing user 4 as the producer for a particular process value. In case the producing user 4 fails, the consuming user 4 will again make a request, in order to find an alternative producer.

Figure 3:
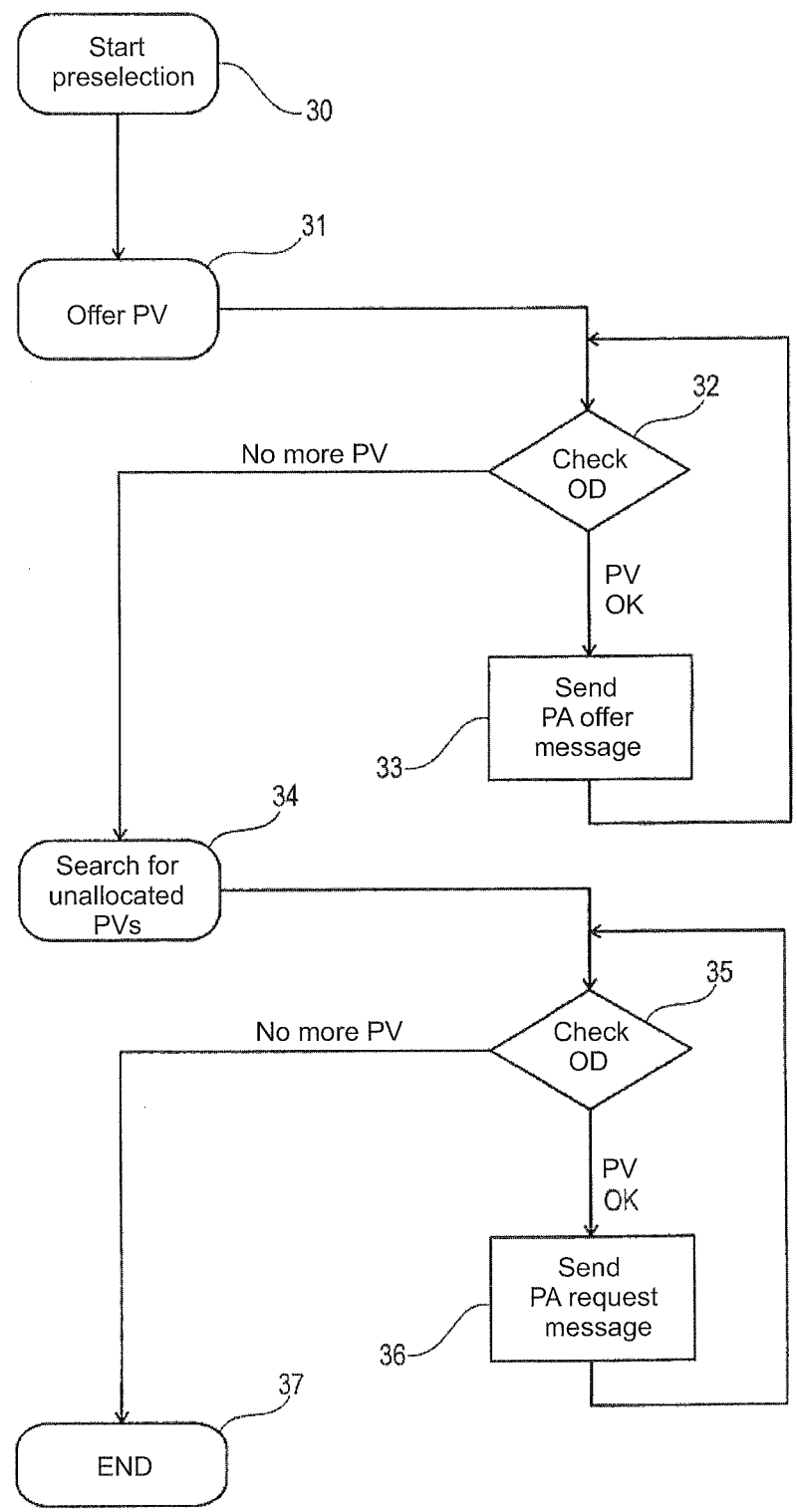

When the user 4 enters the state of preselection 30, it will at first offer 31 the process values produced by itself. This part of the flow chart is shown in FIG. 3. The user 4 first checks 32 its directory of object descriptions (a directory of object descriptions or object directory shall be abbreviated by OD in the Figures). In this directory, a corresponding object may be available relative to each process value. If the check 32 of this directory reveals a process value which the user 4 produces, the user 4 sends 33 an offer telegram to the other users 4 of the BUS system 2. In addition to information about the process value itself, this offer telegram may include information about a classification of this process value. The classification of the process value based on a kind or a type of the user 4 may be performed based on its position and/or its arrangement within the device 1 or installation and/or within the BUS system 2 and/or based on its functionality. An example of such a classification would be: Type of user: pressure gauge; position within the device: process branch no. 7; functionality: measuring instrument.

The user 4 can send respective offer telegrams for all process values that it produces. In other words, steps 32 and 33 are repeated until such time as the directory of object descriptions contains no further process values any more for which an offer telegram has not yet been sent.

Next, the user 4 searches 34 for process values to which no other user 4 is yet firmly allocated as a producer. For this purpose, a renewed check 35 of the directory of object descriptions is made. If the user 4 is exclusively a producer of process values and does not consume any process values itself, the directory does not contain any further objects which are allocated to process values consumed. The user 4 terminates 37 the preselection. If, however, the user 4 is a consumer of at least one process value, the latter is found in the directory of object descriptions and the user 4 sends 36 a request telegram to the other users 4 of the BUS system 2. As already mentioned with regard to the offer telegram, the request telegram may also comprise information regarding a classification of the process value consumed by the user 4. This classification may be configured by analogy with the classification mentioned with regard to the offer telegram.

The allocation between a producer and a consumer of a process value will now be described by way of example by reference to a first and a second user 4. These users 4 may basically be any desired users 4 of the device 1 which have an appropriate functionality.

The offer and request telegrams sent by a first user 4 are received at least by the second user 4 of the BUS system 2. This second user 4 may receive a multitude of offer and request telegrams.

Figure 4:
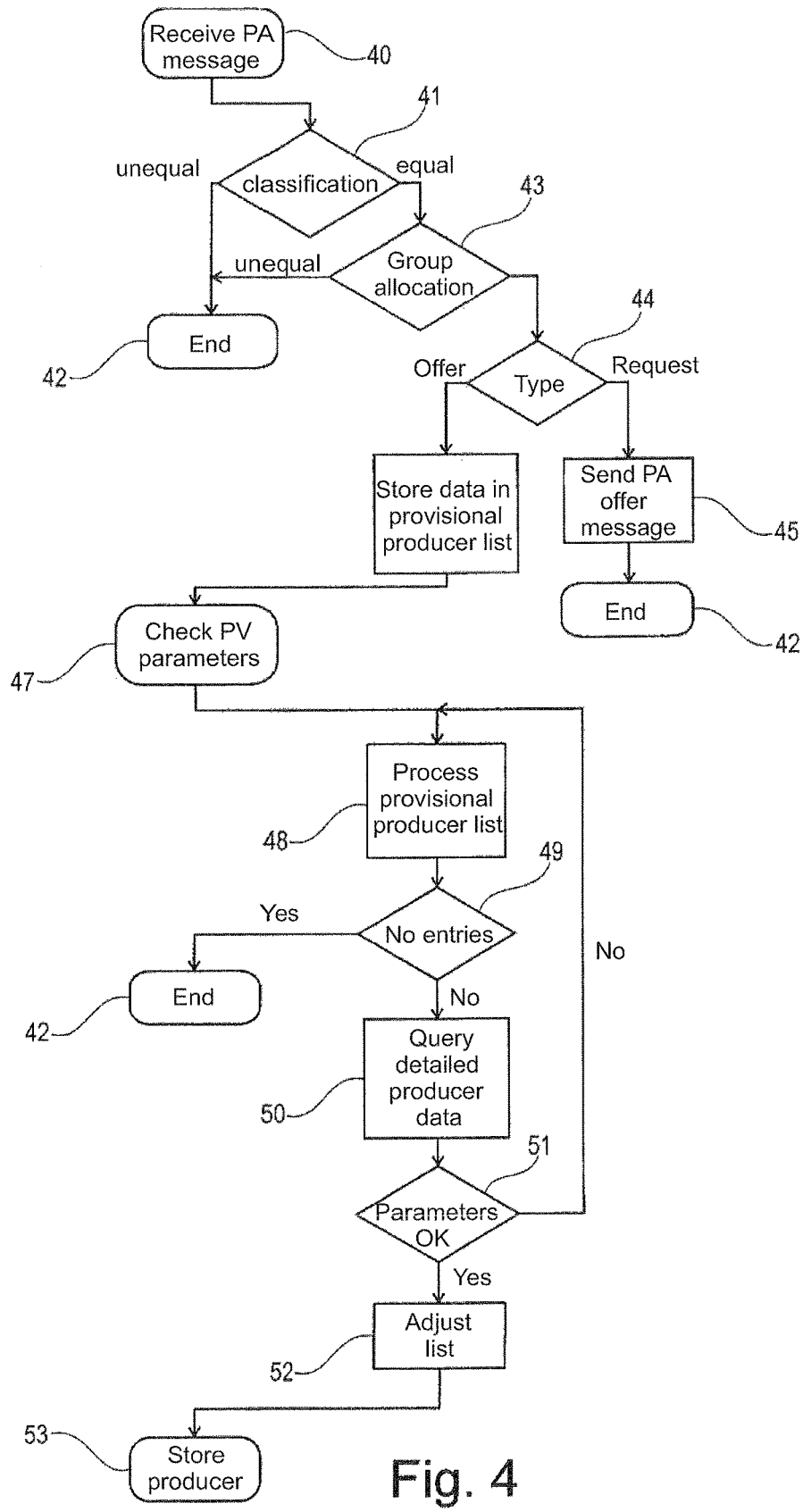

FIG. 4 shows a further part of a flow chart, in which the second user 2 within the BUS system 2 first receives an offer telegram or a request telegram in step 40. In particular in the Figures, request telegrams or offer telegrams shall also be referred to as partner allocation messages, abbreviated as PA messages. The offer telegram or request telegram received is checked 41 with respect to its classification. Should this comparison 41 turn out to be negative, i.e. the classification of the offer or request telegram received does not match the requirements specification of the receiving user 4, the partner allocation for this user 4 ends 42. In the event of a successful comparison, the offer or request telegram is checked 43 with respect to a group membership of the sender. The group membership may be determined, e.g., by the arrangement of the sending user 4 within a particular line or within a particular part of an installation, in particular of a fluidic system. The group membership may be understood to be a constituent of a classification of the process value concerned. If this comparison is not successful, the partner allocation again ends 42. In the event of a successful comparison, the second user 4 checks 44 whether the telegram received is an offer telegram or a request telegram. In case it is a request telegram, the second user 4 responds by sending 45 an offer telegram at least to the sender of the request telegram. After this offer telegram has been sent 45, the process of partner allocation ends 42 for the second user. If, on the other hand, the telegram received is an offer telegram, the address and/or network address of the sending user and a description such as, for example, a type of the process value contained in the offer telegram, is stored 46 in a preselection list.

Subsequently, a verification 47 of the producers of the process values may be effected. For this purpose, the parameters of the process value which can describe it may be checked. In connection with the verification, a preselection list can be processed 48. During the processing 48 of this preselection list, the user 4 can check whether process values exist 49 in this list which were not yet verified. If the preselection list contains no entries, the process ends 42. If the preselection list is not empty, the second user 4 requests further detailed information in regard to the process value from the producer of the process value in a specific request telegram in step 50. For this purpose, the user 4 sends specific request telegrams to the users 4 stored in the preselection list. These specific request telegrams may contain a query with regard to the type of the process values offered. The communication of the specific offer and request telegrams may be based on CANopen telegrams. In other words, this means that the specific offer or request telegrams may be telegrams in accordance with the CANopen standard, which are used for this purpose. The type of a process value may be the unit, the data type and/or the accuracy thereof. The users 4 receiving request telegrams can reply by sending specific offer telegrams in which the respective information is contained. These parameters are checked 51 on the part of the second user. If the parameters do not match the internal requirements specification of the second user, the processing 48 of the preselection list is continued with the next process value. If, however, the parameters of the process value are in accordance with the internal requirements specification of the second user 4, they are marked accordingly 52, provided that the list has been processed completely. That is, the list of producers of the respective process value that was initially drawn up in connection with the preselection is adjusted with respect to those entries or users 4 for which the parameters of the process value offered do not match the requirements specification of the consuming user 4.

For example, if the first user 4 is that producer which supplies the process value matching the requirements specification of the second user 4, a persistent linking is established between the first user 4 as the producer of the process value and the second user 4 as the consumer of the process value. This allocation may more particularly be made and internally saved by the second user 4 as the consumer of the process value.

Figure 5:
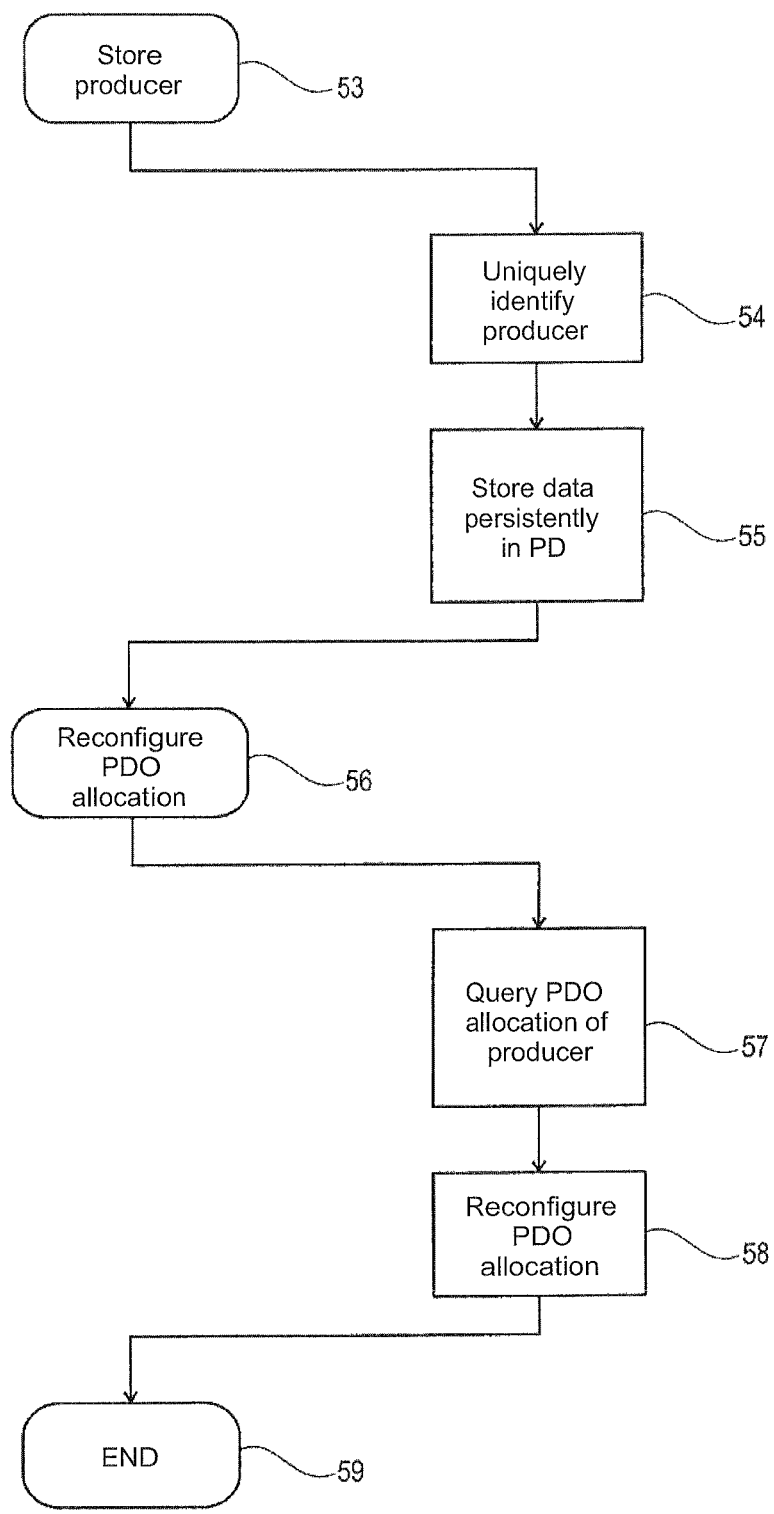

After the consumer of a process value has effected the allocation 53 of the producer of the respective process value, the user 4 proceeds in accordance with the part of the flow chart shown in FIG. 5. The second user 4 queries 54 a unique identification of the first user 4, i.e. of the producer. For example, the first user's 4 hardware address or serial number can be queried. These parameters are persistently stored 55 as being associated with the respective process value and serve for reconnection between the consumer and the producer of the process value, for example during initialization of the device 1. Subsequently, the cyclic polling 56 of the process value is reconfigured. This reconfiguration is effected by an appropriate arrangement of the process data objects (PDO). For this purpose, mapping information is queried 57 from the producer 4 of the process value and saved 58 in the respective process data object of the consumer. At the end of the process, the consumer has firmly allocated one respective producer for each of the process values it requires. It can monitor its producers, for example by monitoring the Heartbeat telegrams thereof. The process of partner allocation can be terminated in step 59.

Figure 6:
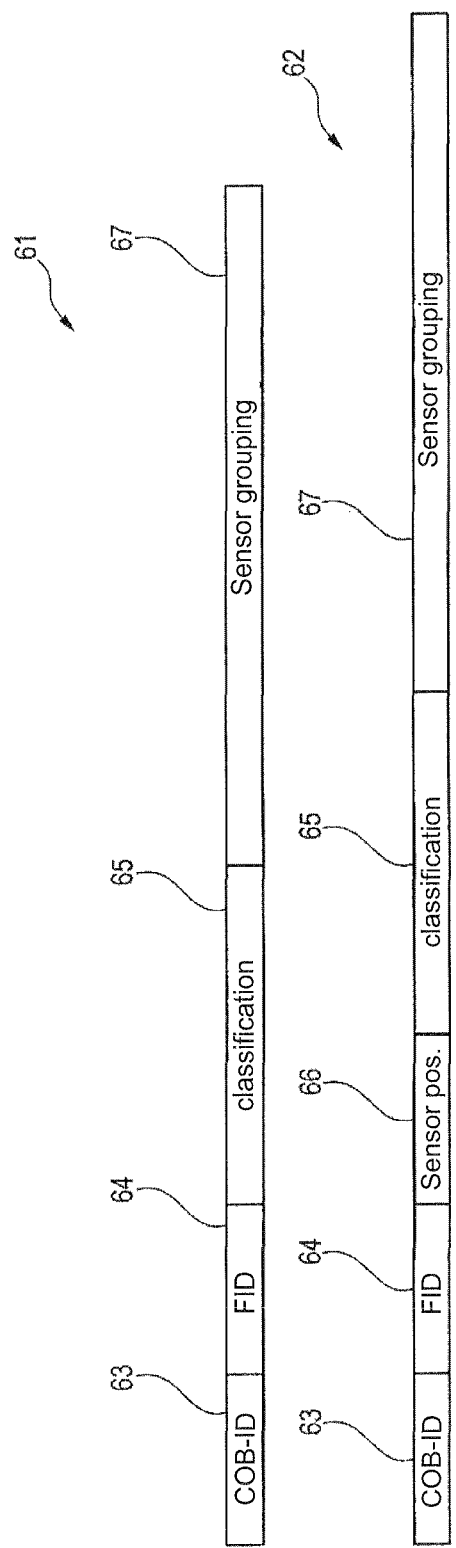
FIG. 6 shows a schematic illustration of a request telegram and an offer telegram, according to two exemplary embodiments.

FIG. 6 shows an exemplary embodiment of a request telegram 61 and an exemplary embodiment of an offer telegram 62. The exemplary embodiments shown relate to the case in which the BUS system 2 is a CAN-BUS system and further uses a communication protocol compatible with CANopen. The request telegram 61 and the offer telegram 62 each comprise an object identification field 63 which is, for example, 11 bits long. This field 63 (COB-ID) is not defined by the CANopen standard and may comprise information describing the data object. The field 64 may identify the type of message sent. For example, in this field 64 (FID) it may be specified that a telegram is involved which was sent in the context of the partner allocation described above.

In addition, the request telegram 61 may comprise a field 65 which comprises information regarding a classification of the process value requested. Similarly, the offer telegram 62 may comprise such a classification field 65 which comprises information regarding a classification of a process value offered. Moreover, the offer telegram 62 may comprise a field 66 (sensor pos.) which comprises information regarding a position in the object directory of a process value offered.

Both the request telegram 61 and the offer telegram 62 may each comprise a field 67 (sensor grouping) which comprises information regarding a group membership of a producer of a process value (in the case of an offer telegram 62) or information regarding a group membership of a consumer of a process value (in the case of a request telegram 61).

The invention claimed is:

1. A device comprising a BUS system with a multitude of users which are producers and/or consumers of at least one process value, wherein information regarding at least one allocation feature is transmitted to the users of the BUS system by the users of a group of users of the BUS system and by the respective users of the group themselves, the allocation feature being determined by the at least one process value produced and/or consumed by the respective users, wherein the users of the group are each at least a producer of at least one process value and are furthermore designed to send an offer telegram each to the other users of the BUS system, the offer telegram comprising information regarding the at least one process value produced by the respective user and regarding a classification of this process value, wherein at least one further user of the BUS system, which is at least a consumer of the at least one process value, is designed to receive the offer telegrams of the users of the group and to evaluate each with regard to the classification of the process values offered, by the further user comparing the classification of the process values offered with its requirements specification with regard to the classification of the process values consumed by it, and wherein the further user is additionally designed to send a respective specific request telegram each to a subgroup of users of the group for which the comparison of the classification of the process values offered with its requirements specification is successful this specific request telegram containing a query with regard to the of process values offered.

2. The device according to claim 1, wherein the allocation feature is further determined by a classification and/or by a type of the at least one process value.

3. The device according to claim 2, wherein the classification of the process values is determined based on a type and/or a kind of the user producing and/or consuming the process value, based on a position and/or an arrangement of the user within an installation and/or within the BUS system and/or based on a functionality of the user.

4. The device according to claim 1, wherein the users of the BUS system are equivalent with regard to their network functionality, and the BUS system comprises no user having a master functionality.

5. The device according to claim 1, wherein a first user of the group is designed to send an offer telegram and/or a request telegram to the other users of the BUS system, and a second user of the BUS system is designed to send an offer telegram at least to the first user in response to a request telegram of the first user.

6. The device according to claim 1, wherein the type of a process value is the unit, data type and/or accuracy thereof.

7. The device according to claim 1, wherein the users of the subgroup are designed to send a specific offer telegram to the further user in reply to the specific request telegram, the specific offer telegram comprising information regarding the type of the process values produced by the respective users of the subgroup.

8. The device according to claim 7, wherein the further user is designed to make use of the information existing in the specific offer telegrams and regarding the type of the process values produced by a user of the subgroup for selecting this user of the subgroup and firmly allocating it to the process value concerned as a producer.

9. The device according to claim 8, wherein the further user is furthermore designed to monitor the producer of the process value.

10. The device according to claim 1, wherein the BUS system is a CAN-BUS system, and wherein a communication protocol of the BUS system is CANopen or a communication protocol that is compatible with CANopen.

11. A fluidic system comprising a device according to claim 1, wherein at least one user of the BUS system, is a fluidic component.

12. The fluidic system according to claim 11, wherein all uses of the BUS system are fluidic components.

13. A method of operating a BUS system comprising a multitude of users, wherein the users of a group of users of the BUS system transmit to the users of the BUS system information regarding at least one allocation feature of the respective user of the group, wherein users of a subgroup are designed to send a specific offer telegram to the further user in reply to the specific request telegram, the specific offer telegram comprising information regarding the type of the process values produced by the respective users of the subgroup.

14. The device according to claim 13, wherein a further user is designed to make use of the information existing in the specific offer telegrams and regarding the type of the process values produced by a user of the subgroup for selecting this user of the subgroup and firmly allocating it to the process value concerned as a producer.

15. The device according to claim 14, wherein the further user is furthermore designed to monitor the producer of the process value.

16. A method of operating a BUS system comprising a multitude of users which are producers and/or consumers of at least one process value, wherein the users of a group of users of the BUS system transmit to the users of the BUS system information regarding at least one allocation feature of the respective user of the group, the allocation feature being determined by the at least one process value produced and/or consumed by the respective users, wherein the users of the group are each at least a producer of at least one process value and are furthermore designed to send an offer telegram each to other users of the BUS system, the offer telegram comprising information regarding the at least one process value produced by the respective user and regarding a classification of this process value, wherein at least one further user of the BUS system, which is at least a consumer of the at least one process value, is designed to receive the offer telegrams of the users of the group and to evaluate each with regard to the classification of the process values offered, by the further user comparing the classification of the process values offered with its requirements specification with regard to the classification of the process values consumed by it, and wherein the further user is additionally designed to send a respective specific request telegram each to a subgroup of users of the group for which the comparison of the classification of the process values offered with its requirements specification is successful, this specific request telegram containing a query with regard to the type of process values offered.

17. The device according to claim 16, wherein the users of the subgroup are designed to send a specific offer telegram to the further user in reply to the specific request telegram, the specific offer telegram comprising information regarding the type of the process values produced by the respective users of the subgroup.

18. The device according to claim 17, wherein the further user is designed to make use of the information existing in the specific offer telegrams and regarding the type of the process values produced by a user of the subgroup for selecting this user of the subgroup and firmly allocating it to the process value concerned as a producer.

19. The device according to claim 18, wherein the further user is furthermore designed to monitor the producer of the process value.

* * * * *